(12) United States Patent
Miller et al.

(10) Patent No.: US 8,874,569 B2
(45) Date of Patent: Oct. 28, 2014

(54) SYSTEMS AND METHODS FOR IDENTIFYING AND VISUALIZING ELEMENTS OF QUERY RESULTS

(71) Applicant: LexisNexis, a divison of Reed Elsivier Inc., Miamisburg, OH (US)

(72) Inventors: Richard D. Miller, Yellow Springs, OH (US); Christopher Scott Basham, Evansville, IN (US); Jacob Aaron Myers, Dayton, OH (US); Sanjay Sharma, Mason, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 0 days.

(21) Appl. No.: 13/689,049

(22) Filed: Nov. 29, 2012

(65) Prior Publication Data
US 2014/0149403 A1    May 29, 2014

(51) Int. Cl.
*G06F 17/30* (2006.01)

(52) U.S. Cl.
CPC .... *G06F 17/30696* (2013.01); *G06F 17/30684* (2013.01)
USPC ........... 707/728; 707/765; 707/769; 707/749; 715/810; 715/209; 715/835; 345/467

(58) Field of Classification Search
CPC ...... G06Q 30/02; G09B 5/00; G06F 17/2745; G06F 17/30011; G06F 17/30722; G06F 17/30684; G06F 17/30696; G06F 30/02
USPC ......... 707/765, 749, 769, 706, 722, 775, 723, 707/728, 737, E17.014, E17.108, E17.044; 715/810, 209, 835; 345/467
See application file for complete search history.

(56) References Cited

U.S. PATENT DOCUMENTS

| | | | |
|---|---|---|---|
| D512,724 S | 12/2005 | Najda et al. | |
| D566,715 S | 4/2008 | Soderstrom | |
| 7,707,517 B2 * | 4/2010 | Bier et al. | 715/835 |
| 7,707,577 B2 * | 4/2010 | Inaba | 705/402 |
| 8,301,701 B2 * | 10/2012 | Goodman et al. | 709/206 |
| 2006/0047656 A1 * | 3/2006 | Dehlinger et al. | 707/6 |
| 2006/0047701 A1 * | 3/2006 | Maybury et al. | 707/104.1 |
| 2006/0277496 A1 * | 12/2006 | Bier et al. | 715/810 |
| 2007/0234140 A1 * | 10/2007 | Lee et al. | 714/715 |
| 2008/0189269 A1 * | 8/2008 | Olsen | 707/5 |
| 2008/0263022 A1 * | 10/2008 | Kostorizos et al. | 707/E17.014 |
| 2009/0006384 A1 * | 1/2009 | Tunkelang et al. | 707/5 |
| 2009/0006387 A1 * | 1/2009 | Tunkelang et al. | 707/5 |
| 2009/0010301 A1 * | 1/2009 | Nagahisa | 374/1 |
| 2009/0150827 A1 * | 6/2009 | Meyer et al. | 715/810 |
| 2010/0223276 A1 * | 9/2010 | Al-Shameri et al. | 707/769 |
| 2010/0257059 A1 * | 10/2010 | Fujioka et al. | 705/14.66 |
| 2011/0276568 A1 * | 11/2011 | Fotev | 707/728 |

(Continued)

OTHER PUBLICATIONS

Kuang Chen, Akshay Kannan, Jayant Madhavan, and Alon Halevy—"Exploring schema repositories with schemr" —Newsletter ACM Sigmod Record vol. 40 Issue 1, Mar. 2011—pp. 11-16.*

(Continued)

*Primary Examiner* — Anh Ly
(74) *Attorney, Agent, or Firm* — Dinsmore & Shohl LLP

(57) ABSTRACT

The systems and methods described herein generally relate to increasing user productivity in reviewing query results by visually depicting the presence/absence of a set of query terms in a set of paragraphs across a set of documents.

15 Claims, 4 Drawing Sheets

(56) References Cited

U.S. PATENT DOCUMENTS

| | | | |
|---|---|---|---|
| 2011/0276886 A1* | 11/2011 | Hall et al. | 715/734 |
| 2013/0124534 A1* | 5/2013 | Dinh et al. | 707/748 |
| 2013/0275404 A1* | 10/2013 | Osetinsky | 707/706 |
| 2014/0114962 A1* | 4/2014 | Rosenburg et al. | 707/723 |

OTHER PUBLICATIONS

H Jacobson, M Kassa, Yx Hu, A Potgieter, C Griffith—2005—shenzi.cs.uct.ac.za—"Project Proposal Marine Invertebrate Animals Ontology"—Jul. 19, 2005—pp. 1-7.*

First Examination Report; Government of India Patent Office, Jun. 7, 2013, Kolkata, India.

Jung-Hisien Chiang, et al., Condensing biomedical journal texts through paragraph ranking, Bioinfomatics Advance Access, Feb. 16, 2011, Oxford University Press.

Misha Weiss-Lijn, et al., Supporting document use through interactive visualization of metadata, University of College London, Departinent of Computer Science, http://vw.indiana.edu/visua101/weiss-lijn-et-al.pdf visited on Jan. 22, 2013.

tf-idf, Wikipedia, retrieved Jan. 22, 2013, http://en.wikipedia.org/wiki/Tf%E2%80%93idf.

International Searching Authority, Notification of Transmittal of The International Search Report and the Written Opinion of The International Searching Authority, or the Declaration, International Application No. PCT/US2013/071233, European Patent Office, P.B. 5818 Patentlaan 2, NL-2280 HV Rijswijk.

Marti A. Hearst, TileBars: Visualization of Term Distribution Information in Full Text Information Access, Chi '95 Mosaic of Creativity, May 7-11, 1995, 59-66, CHI '95, Denver, Colorado.

* cited by examiner

Search Terms: | Volunteer Coach Youth Injury Liability Waiver | | Order By Paragraph Order | ▼ | Paragraph #29 (1 of 5) | 140 | Prev | Next |

Volunteer
Coach
Youth
Injury
Liability
Waiver 1. 155 Md. App. 82 - Kelly v. McCarrick 2. 1997 Ohio App. LEXIS 1577 - Zivich v. Mentor Soccer Club 3. 2002 Conn. Super. LEXIS 2778 - Fischer v. Rivest With respect to the negligent training in emergency care claim, the court concluded that the Kellys "failed to present admissible evidence of negligence" to show either that "the defendants breached their duty of care in the manner in which Plaintiff Tara Kelly was treated after sustaining an injury " or that Tara's" injuries were worsened when she was removed from the field or thereafter." 4The court did not address whether appellee Welch had statutory immunity from negligence liability . See, e.g., Md. Code (1974, 2002 Repl. Vol, 2003 Cum. Supp.), § 5-406, § 5-407, § 5-802 of the Courts & Judicial Proceedings Article (limiting personal liability for certain agents and volunteers and officials of charitable, recreational, athletic, and civic organizations). See generally Howard P. Benard, Little League Fun, Big League Liability 8 Marq. Sports L. J. 93 (1997)(advocating immunity legislation and a liability scheme other than ordinary negligence for Volunteer Little League Coaches Should Not Be Immune from volunteer coaches ); Jamie Brown, Legislators Strike Out: (1997)(opposing immunity based inter alia on the availability of Tort Liability , 7 Seton Hall J. Sports L. 559, 580-8 1 insurance).

FIG. 3

SYSTEMS AND METHODS FOR IDENTIFYING AND VISUALIZING ELEMENTS OF QUERY RESULTS

CROSS-REFERENCE TO RELATED APPLICATIONS

The present application cross-references U.S. Design patent application 29/438,388, for a BOXED ABACUS ICON, filed concurrently with this non-provisional patent application.

COPYRIGHT NOTICE

A portion of this disclosure, including Appendices, is subject to copyright protection. Limited permission is granted to facsimile reproduction of the patent document or patent disclosure as it appears in the U.S. Patent and Trademark Office (PTO) patent file or records, but the copyright owner reserves all other copyright rights whatsoever.

BACKGROUND

1. Field

The present specification generally relates to data analytics and visualization of a result set.

2. Technical Background

Embodiments utilize analytics to determine document relevance as well as techniques to generate for graphical display a multi-faceted representation of document relevance. The methods and systems herein build on techniques for information retrieval such as TF/IDF. TF/IDF (term frequency—inverse document frequency) is a numerical statistic which reflects how important a word is to a document in a collection or corpus. It is often used as a weighting factor in information retrieval and text mining. The TF/IDF value increases proportionally to the number of times a word appears in the document, but is offset by the frequency of the word in the corpus, which helps to control for the fact that some words are generally more common than others. http://en.wikipedia.org/wiki/Tf%E2%80%93idf

SUMMARY

It should be appreciated that various configurations and combinations of the following embodiments may be deployed while still embodying the principles disclosed herein.

In one embodiment, a system is configured to facilitate review of a set of document search results comprising at least one computer readable storage medium and at least one computer machine. The computer readable storage medium includes a database management system which is stored thereon and configured to access a corpora of electronically stored content either directly or indirectly. A computer machine is configured to receive a query request, comprising a set of two or more search terms, as a computer machine input; search said corpora for a set of at least two documents relevant to said query request; score a set of paragraphs associated with said set of at least two documents, using an algorithm which calculates a measurement of term density versus term diversity in each paragraph in said set of paragraphs; and rank said set of paragraphs based on said scoring step. A computer machine (possibly the same one which received the query request although the system could also be configured in a distributed environment) is configured to generate at least one interactive graphical user interface (GUI) to display at least one visually coded graphic to indicate whether each of said two or more search terms is present in a subset of said set of paragraphs.

In another embodiment, the subset of said set of paragraphs comprises a preset number of paragraphs corresponding to a minimum score.

In another embodiment, the subset of said set of paragraphs comprises a preset number of paragraphs wherein the preset number of paragraphs ranked higher than the rest of the paragraphs from the set of paragraphs.

In another embodiment, a first visually coded graphic is generated for a first document in said set of at least two documents and a second visually coded graphic is generated for the second document in the set of at least two documents.

In another embodiment, the algorithm assigns a higher score to a subset of said set of paragraphs with a greater term density.

In another embodiment, the algorithm assigns a higher score to a subset of said set of paragraphs with a greater term diversity.

In another embodiment, the algorithm includes a weighting factor for a term diversity variable and a weighting factor for a term density variable.

In another embodiment, the algorithm includes a weighting factor for a term diversity variable and a weighting factor for a term density variable. A preset number of paragraphs, ranked higher than the rest of the paragraphs from said set of paragraphs, comprises said subset of said set of paragraphs. The preset number of paragraphs are surfaced in said at least one visually coded graphic.

In another embodiment the at least one visually coded graphic comprises a set of tiles wherein each row in said set of tiles represents a surfaced paragraph based on said scoring step.

In another embodiment each search term from said two or more search terms is assigned a graphical indicator; each paragraph in said subset of said set of paragraphs is assigned to a vertical line in a set of vertical lines; and wherein said visually coded graphic includes a depiction of said graphical indicators on each vertical line corresponding to the presence of said search term in said paragraph.

In another embodiment, the at least one visually coded graphic comprises a boxed abacus icon.

In another embodiment, a method facilitates review of a set of document search results by performing steps including: receiving, as a computer machine input, a query request wherein said query request comprises two or more search terms; accessing a corpora of electronically stored content either directly or indirectly on at least one computer readable storage medium; searching said corpora for a set of relevant documents; scoring a set of paragraphs, within said set of relevant documents, using an algorithm which calculates a measurement of term density versus term diversity for each of said set of paragraphs; ranking said set of paragraphs based on said measurement; and generating for graphical display: a legend correlating a visually coded graphical indicator with each search term; a list of a subset of said set of relevant documents; and an icon, for each document in said list of relevant documents, summarizing whether a search term is present in a preset number of paragraphs associated with said document.

In another embodiment, the icon in the method is a boxed abacus icon.

In another embodiment, the icon in the method is a tile bar icon.

In another embodiment, the method further includes, if a paragraph, associated with a document that was not included in said subset of relevant documents, receives a higher score, in said ranking step, than any paragraph in said subset of relevant documents, inserting said document into said subset of relevant documents.

In another embodiment, a computer readable medium comprising computer executable instructions for execution by a computer machine to facilitate review of a set of document search results that when executed: receives a query request comprising two or more search terms; accesses a corpora of electronically stored content either directly or indirectly; searches a corpora for a set of candidate documents; scores a set of paragraphs associated with said set of candidate documents using an algorithm which calculates a measurement of term density versus term diversity; ranks said set of paragraphs based on said measurement; generates for graphical display at least one boxed abacus icon for each of a subset of said set of candidate documents wherein a visually-coded graphical indicator is associated with each search term and displayed on a line associated with a given paragraph from a subset of said set of paragraphs to indicate if said search term is present in said given paragraph. In an embodiment, the visually-coded graphical indicator may be unique.

In another embodiment, the boxed abacus icon is linked to a set of underlying content associated with each paragraph depicted in said boxed abacus icon and wherein said boxed abacus icon may be clicked through to display said set of underlying content.

In another embodiment, the search terms are highlighted in a display of said set of underlying content.

In another embodiment, the subset of said candidate documents is chosen based on the documents containing the highest scoring paragraphs when said paragraphs are ranked.

In another embodiment, each boxed abacus icon includes only one paragraph from each document in said subset.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 is an embodiment of an exemplary interface generated for graphical display integrating a set of boxed abacus icons by depicting search terms within a set of paragraphs identified from a result set of documents responsively selected from a query of search terms.

FIG. 2 is an embodiment of an exemplary interface generated for graphical display providing a matrix of boxed abacus icons for a set of results responsively produced from a query of search terms.

FIG. 3 is an embodiment of an exemplary interface generated for graphical display wherein a set of tile bars is integrated into a search result set of a third party search engine.

DETAILED DESCRIPTION

Figure 4:
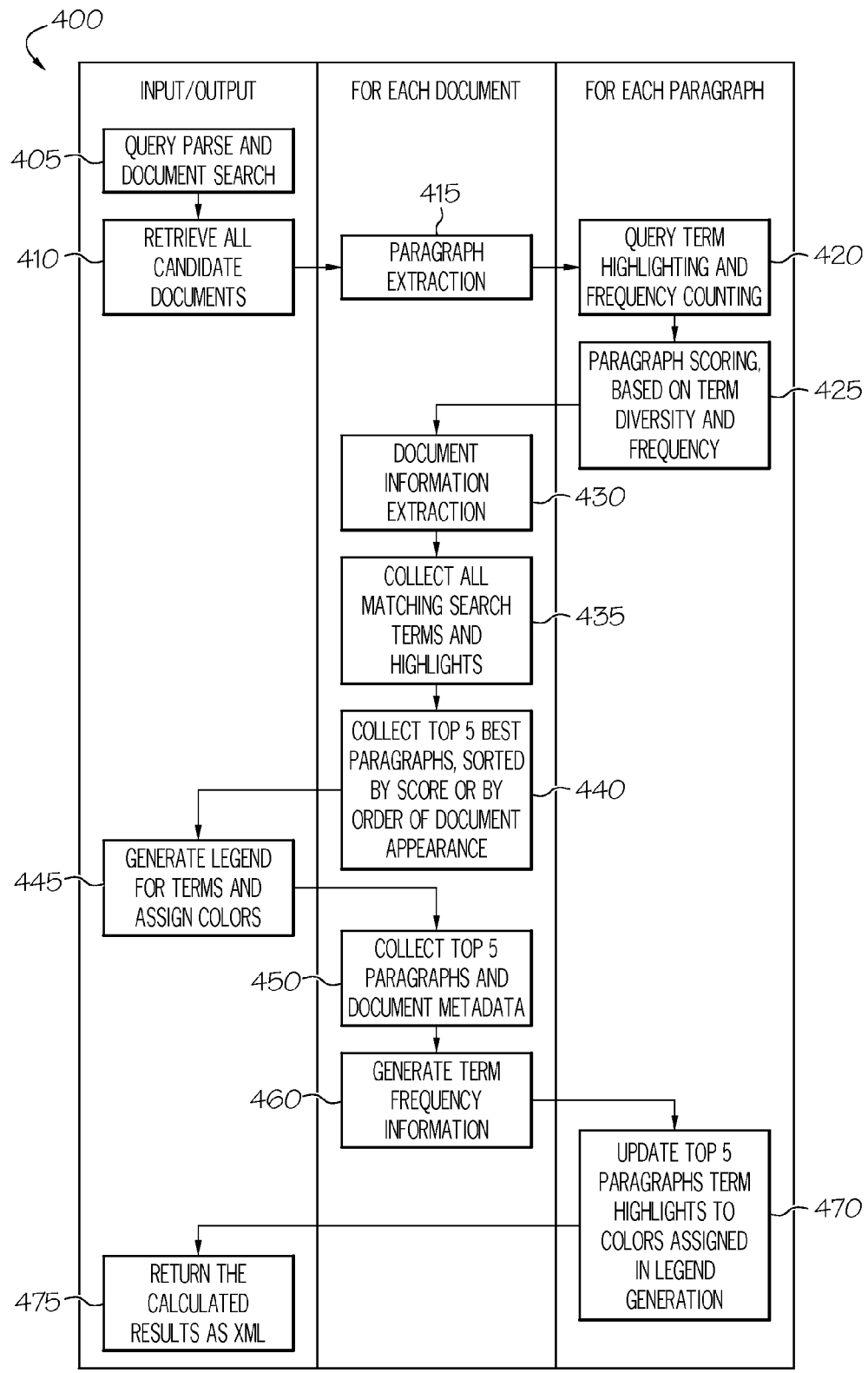
FIG. 4 is an exemplary process flow for one embodiment of the system.

Embodiments described herein generally relate to increasing user productivity in reviewing query results. An embodiment provides a system and method to determine and then visually depict the presence/absence of a set of query terms in a set of paragraphs across a set of documents. Alternative embodiments may rank a set of paragraphs in a single document. Embodiments may include two, three, or more paragraph visualizations for two or more documents.

Embodiments allow a user to identify parts of a given text document included in a collection returned from a query. Embodiments of the system and method allow a user to make judgments about documents without spending extra time viewing unnecessary elements. Embodiments provide results in a display of information to enable users to assess results through the simultaneous display of programmatically determined document relevance (e.g., through the use of tools which order relevance based on an analysis of document metadata (e.g., Lexis Advance) or other commercially available analysis tools including, but not limited to, sentiment analyzers) with a complimentary indication of relevance based on user query terms and the flexibility of visualization design to provide a richer interface for assessing query results.

An embodiment provides a visualization of a pattern of query terms contained in each document analyzed. In an embodiment, a user may control the order of the documents in the results display (e.g., based on a paragraph analysis which ranks documents with higher scoring paragraphs at the top of the list). A user may also control the order of the icons displayed (e.g., based on order of appearance in a document, based on a relevance score generated for each paragraph represented by an icon—such as a term-rich paragraph ranking higher than a term-poor paragraph, etc.). Embodiments allow a user to associate a visual indicator of a term's existence to the manifestation of the term in the identified paragraph.

Embodiments of the various visualizations may be programmed to fit a variety of graphical output mechanisms whether a desktop monitor, laptop, smart phone or other graphical media. Embodiments may adjust the sizing of the visualization to accommodate full screens or smaller pop-up displays. Orientation may also be adjusted to accommodate an embodiment displayed on a particular type of media. Embodiments may be installed to specially code a general purpose computer machine and run from computer executable instructions encoded on a tangible computer-readable medium.

DEFINITIONS

"Automatically" includes to the use of a machine to conduct a particular action.

"Boxed Abacus Icon" includes a configurable icon generated for graphical display on a computerized visual output (e.g., screens associated with a variety of graphical output mechanisms), based on a result determined by executing an algorithm which assesses term density and/or diversity (the weighting of each may be individually set as well), comprising two or more vertical lines, wherein a line represents a paragraph disposed within a document, and a set of coded (e.g., color, shaded, shaped) boxes or indicators aligned upon said vertical lines wherein each box represents an associated query term's presence in said paragraph. In another embodiment, the orientation of the lines may be reversed. In another embodiment, the axis variables may be transposed. An exemplary embodiment of a Boxed Abacus Icon is depicted in FIG. 1 at 130.

"Calculate" includes Automatically determining or ascertaining a result using Computer Machine Input.

"Computer Machine" includes a machine (e.g., desktop, laptop, tablet, smart phone, television, server, as well as other current or future computer machine instantiations) comprising a computer processor that has been specially configured with a set of computer executable instructions.

"Computer Machine Input" includes input received by a Computer Machine.

"Generate for Graphical Display" includes to Automatically create, using Computer Machine Input, an object(s) to be displayed on a GUI (e.g., a listing of hyperlinks, a heat map, a dashboard comprising a table, an icon including a Boxed Abacus Icon, shading, color-coding, etc.).

"GUI" or "Graphical User Interface" includes a type of user interface that allows users to interact with electronic devices via images (e.g., maps, grids, panels, icons, etc.) displayed on a visual subsystem (e.g., desktop monitor, tablet/phone screen, interactive television screen, etc.).

"Metadata" includes a type of data whose purpose is to provide information concerning other data in order to facilitate their management and understanding. It may be stored in the document internally (e.g. markup language) or it may be stored externally (e.g., a database such as a relational database with a reference to the source document that may be accessible via a URL, pointer, or other means).

"Smart Indexing" includes a methodology by which subject matter experts and information professionals create vocabularies and the algorithmic rules governing the application of tags to a content item. It may involve mining a data corpus to identify at least one set key terms or possible multiple sets including terms sets of increasing granularity or specificity to a given subject.

"Surfacing" comprises a variety of methodologies employed to made content stored in servers and connected to the Internet (or other network system) available for further review or selection. Content made available through surfacing may comprise a hierarchy of computer-selectable links or other information delivered in response to a query.

"Term Density" comprises a measurement of the number of key terms appearing within a given corpus or subset of said corpus (e.g., a document or a paragraph).

"Term Diversity" comprises a measurement of the number of different key terms appearing within a given corpus or a subset of said corpus. Thus, a paragraph with three distinct key terms will have a higher term diversity than a paragraph with ten key terms that are the same.

Figure 2:
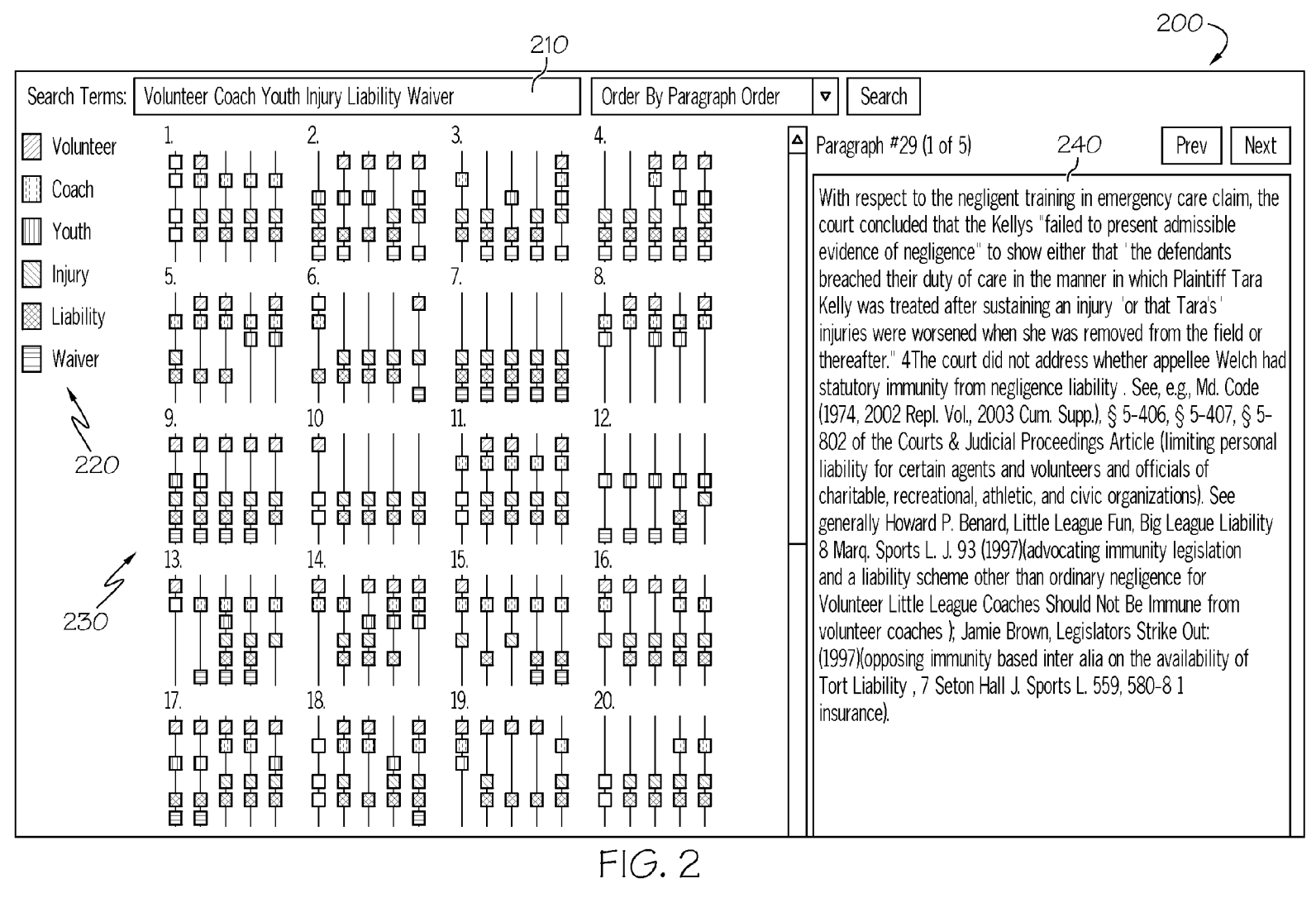

Referring to embodiments depicted in FIGS. 1-2, collections of visualizations may be integrated into a results display in a variety of ways including via a matrix of multiple results. This may further facilitate a reviewer looking for particular term combinations. In FIG. 1, a Boxed Abacus Icon (e.g., 130) may be provided for each of multiple documents Surfaced to illustrate query term (110) distribution in a group of identified paragraphs for each document. Each query term (110) may be colored, shaded or otherwise coded (120) to allow an end-user to identify which terms are present in a given paragraph. The use of the Boxed Abacus Icon (e.g., 130) is an exemplary icon to surface these results chosen to portray the terms in an aesthetically pleasing manner. Many more iconic/graphical figures may be possible to convey the result set. In FIG. 1, an exemplary result set (100) of three documents (the number of documents should not be considered limiting) is provided with term distribution across the top five paragraphs (again the number of paragraphs should not be considered limiting but may, in an embodiment, include at least two paragraphs for comparison purposes) in each document via a Boxed Abacus Icon (130) for each document.

In FIG. 2, a legend (220), of query terms (210), may provide coding to identify query term (210) distribution in a specific paragraph. In FIG. 2, an exemplary result set of twenty icons is provided (the number of icons should not be considered limiting) with a Boxed Abacus Icon (230) displaying whether terms are present in each of the top five paragraphs retrieved for each icon. A panel (240) may be provided to display a selection of paragraphs with the highest term distribution for a given set of query terms (210). Alternatively, the system may be configured to Surface the paragraphs with the highest term diversity. In other embodiments a weighting algorithm may be preconfigured or user-specified to juxtapose term diversity versus term density. It may be appreciated that multiple configurations of the Boxed Abacus Icons (230) may be designed to suit various graphical user displays.

In an alternative embodiment, the top paragraphs may be from the same document. Alternatively, a result set may comprise the top paragraphs across a group of documents so that the highest scoring paragraphs (whether from the same document or different documents) are displayed within the same graphical icon or visualization. In another embodiment, the paragraphs themselves may be ranked outside of their identification within a result set of the top ranked documents. In such an embodiment, a toggle might exist in the results display to allow the user to evaluate either the most relevant paragraphs or merely view the top documents and the best paragraphs within those documents.

Figure 3:
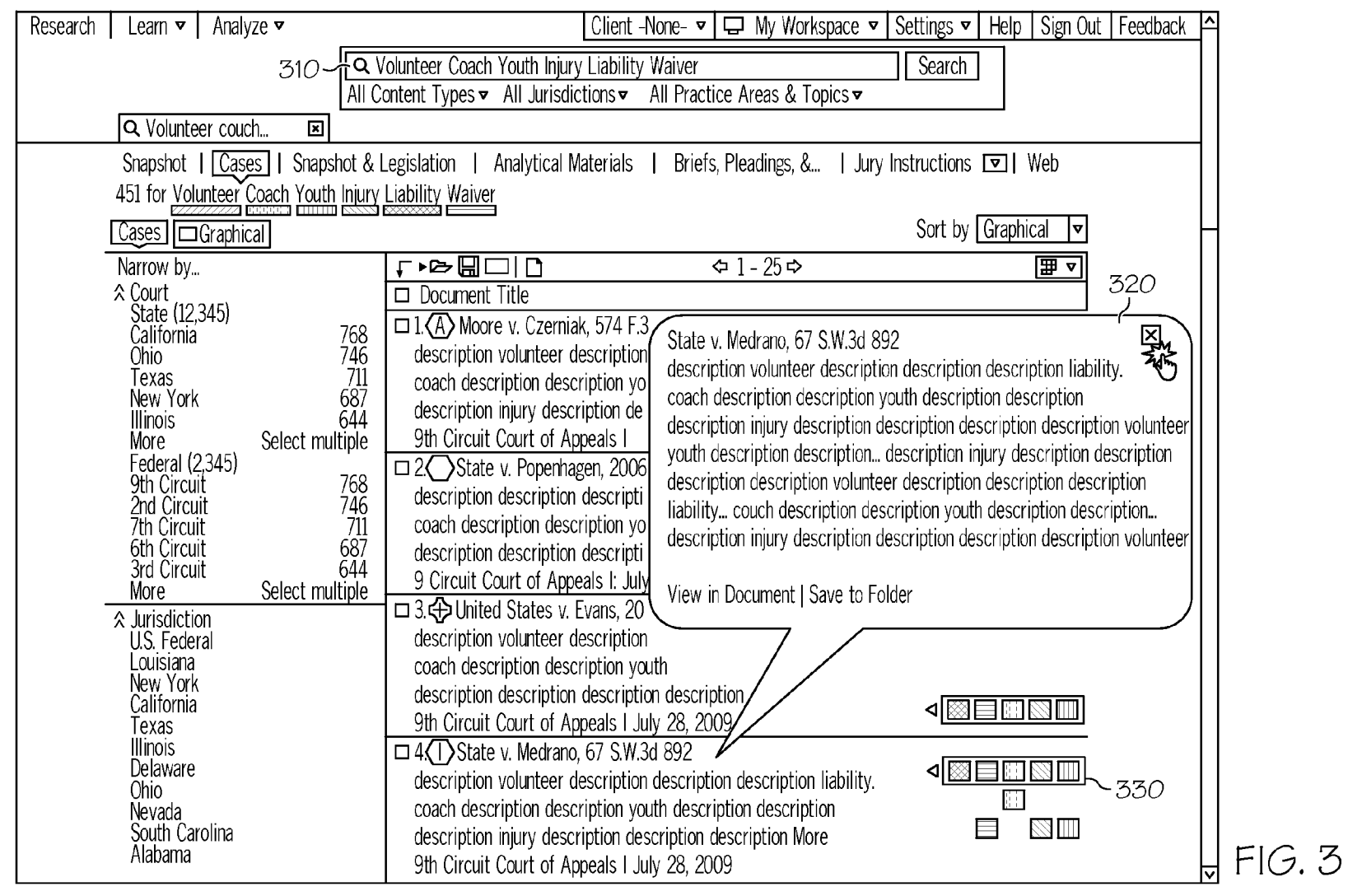

Referring to FIG. 3, while embodiments may generate for graphical representation a set of stand-alone results, such graphical generation may also be embedded into search engines or other products which return result sets. In FIG. 3, an embodiment (300) depicts a result set from a query (310) against a database of case law (it may be also possible to customize a view to show a particular number of paragraphs). A result set for each case may be provided showing query term (310) distribution in a tile bar format (330) (one row for each paragraph) depicting a coded tile for each term present in a paragraph identified as relevant. Coding may be added to a legend/list of query terms (310) to assist in identification of terms in a given paragraph. Selection of a specific row may provide a pop-up window (320) detailing the coded text for each term present in that paragraph. It would also be possible to integrate the Boxed Abacus Icon (130/230) in place of the tile bar visualization.

In an embodiment, a search engine identifies and inspects potentially relevant documents within a query-results collection. In an embodiment, an algorithm may be further configured to utilize a specialized index (e.g., Smart Indexing) to focus a result set on a set of case law (in alternative embodiments, a specialized index could be applied to other types of content such as scientific journals, fictional content, etc.).

Once an initial result set has been programmatically determined, content may be assessed for relevance based on a score derived from assessing query term (110/210/310) density and diversity within the subject paragraphs. It will be appreciated that embodiments of relevance ranking according to the methods disclosed herein may be applied to a wide array of subject matter including legal, medical, scientific, popular, and more. If the term is present, a visual indicator includes a symbol (e.g. square) coded for the associated term as indicated in an accompanying legend. If the term is not present, that position on the visual indicator is left blank (or white) or empty (e.g., an outline of a box is provided that is unfilled). In an example, if all query terms (110/210/310) are present in the paragraph, a visual indicator will include a series of non-blank symbols. The symbols for the paragraphs may be ordered either in order of the occurrence of each paragraph within the document or in order of most-to-least-relevant paragraph based on an assessment of term diversity and/or density.

In an additional embodiment, a user may select a given paragraph symbol in order to display a set of text corresponding to that paragraph in a separate display (e.g., a separate pane or pop-up window). Query terms (110/210/310) in a corresponding paragraph window/pane may be highlighted/bolded/font-differentiated/colored/other in some way. In an embodiment, the legend may be color-coded and then the query terms may also be highlighted or font-colored in the color that corresponds to that term within the visualization. In another embodiment, highly dense query terms may receive additional shading to indicate their relative frequency to other terms in a given section.

In various embodiments, user customizations may be possible including, but not limited to, representation of a certain number of paragraphs, ordering of the icons within the visualization by various relevance ranking algorithms (e.g., term density, term diversity, or a combination of both).

In another embodiment, a visualization may be fine-tuned to provide a variety of ways the terms may match a user's query (e.g., string subsets, term synonyms, etc.). A user may be able to customize the application to configure how closely terms must be before a match is recognized.

In another embodiment, a visual element may be customized to represent different data dimensions (e.g., issues versus facts; proper nouns of recognized entities, etc.).

Referring to FIG. 4, an embodiment is provided for a methodology (400) to generate for graphical display a set of Boxed Abacus Icons (130/230) to indicate term density within a set of documents/paragraphs directly returned as a result of a query to a database or content (or via indirect access such as to a set of pointers to such content via a set of Metadata). A system may receive a query to parse and perform a document search (405). Using commercially available software (including but not limited to various search engines, Lexis Shepard's for Research, etc.) a set of candidate documents may be returned or Surfaced (410).

Continuing with the example embodiment provided in FIG. 4, for each document, the system may perform paragraph extraction (415). For each paragraph extracted, the system may highlight/extract/quantify the number of query terms (110/210/310) in said paragraph (420). A value may be assigned to a total search term count as well as a count per search term appearing in a given paragraph (420). In alternative embodiments, a higher score or factor may be applied where there is an exact match or a search term appears within a headnote or associated with other key metadata. For instance, if a search term is a "rare term" (i.e., it occurs below a specific threshold across the entire corpus), it may have a higher score/factor associated with it. In additional embodiments, a term appearing in (or proximate to) a highly cited paragraph/term may have a higher score/factor applied to it. In another embodiment, if the term appears in a majority opinion, rather than a dissenting opinion, then it may have a higher factor/score applied to it.

These results may be used to determine the ultimate document subset or possibly paragraph subset that will be surfaced.

A scoring algorithm may be applied to each paragraph to determine its relevance based on search term diversity and frequency/density within that paragraph (425). Scoring algorithms may be configured to weight diversity/frequency equally or with one factoring higher than the other. An embodiment of the system may be configured to receive a user input or a system administrator as computer machine input which predetermines or configures a weight to be associated with each factor (diversity/frequency). Additionally, individual search terms may also be weighted so that their presence within a given paragraph may cause the algorithm to score that paragraph more favorably (i.e., with a higher score than a paragraph not containing that term with all other factors being equal).

Based on a set of scores Calculated, an embodiment of the system may rank the paragraphs retrieved from most relevant to least relevant (or vice versa). Based on a subset of paragraphs scored and ranked, an embodiment may correlate the highest ranked paragraphs (depending on a number of documents that the system is ultimately configured to display . . . it may be 2, 3, 4, 5 . . . n) with their originating documents (430). Once again the display of documents and/or paragraphs may be preset by the system or an administrator or received through a GUI via an end-user.

Embodiments may tag or otherwise designate each matching search term in each document (435) and/or in the highest ranked paragraphs. Documents may be presented based on their paragraph scores or by the original order of the document return set (440) from running the initial query.

A legend for query search terms may be generated and colors assigned to each query term (445). Alternatively, the legend could be configured earlier in the process and terms could be coded upon identification in step (420) or some point between (420) and (470).

In the example provided, the top five paragraphs (450) and their associated metadata are collected for display. The term frequency for each paragraph may be generated (or may be fetched if previously Calculated) (460). In this embodiment, color-coding or other coding may be applied to terms in the retrieved document/paragraphs (470). Finally, a result set may be generated in XML or other markup language for visual generation (475). A result set may include a Boxed Abacus Icon (130/230) with a color-coded icon depicting whether a query search term appears within a given paragraph or in a set number of paragraphs within a given document. Paragraphs may also be associated with the original query. In another embodiment, a tile bar may be used to represent query distribution in a given paragraph. A result set may also include a window displaying a set of text associated with a given paragraph wherein a set of query terms have been highlighted/color-coded according the legend generated for said set of query terms (470).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system configured to facilitate review of a set of document search results comprising:
   a. at least one computer readable storage medium on which a database management system is stored and configured to access a corpora of electronically stored content either directly or indirectly;
   b. a computer machine configured to:
      i. receive a query request, comprising a set of two or more search terms, as a computer machine input;
      ii. search said corpora for a set of at least two documents relevant to said query request;

iii. score a set of paragraphs associated with said set of at least two documents, using an algorithm which calculates a measurement of term density versus term diversity in each paragraph in said set of paragraphs;

iv. rank said set of paragraphs based on said scoring step; and c. a computer machine configured to generate at least one interactive graphical user interface (GUI) to display at least one visually coded graphic, comprising a boxed abacus icon, to indicate whether each of said two or more search terms is present in a subset of said set of paragraphs wherein said subset comprises a preset number of paragraphs receiving higher scores, in said ranking step, than a set of paragraphs not included in said subset.

2. A system, as claimed in claim 1, wherein said subset of said set of paragraphs comprises a preset number of paragraphs corresponding to a minimum score.

3. A system, as claimed in claim 1, wherein a first visually coded graphic is generated for a first document in said set of at least two documents and a second visually coded graphic is generated for said second document in said set of at least two documents.

4. A system, as claimed in claim 1, wherein said algorithm scores higher a subset of said set of paragraphs with a greater term density.

5. A system, as claimed in claim 1, wherein said algorithm scores higher a subset of said set of paragraphs with a greater term diversity.

6. A system, as claimed in claim 1, wherein said algorithm includes a weighting factor for a term diversity variable and a weighting factor for a term density variable.

7. A system, as claimed in claim 1, wherein said algorithm includes a weighting factor for a term diversity variable and a weighting factor for a term density variable; and a preset number of paragraphs, ranked higher than the rest of the paragraphs from said set of paragraphs, comprises said subset of said set of paragraphs; and said preset number of paragraphs are surfaced in said at least one visually coded graphic.

8. A system, as claimed in claim 1, wherein said at least one visually coded graphic comprises a set of tiles wherein each row in said set of tiles represents a surfaced paragraph based on said scoring step.

9. A system, as claimed in claim 1, wherein each search term from said two or more search terms is assigned a graphical indicator; each paragraph in said subset of said set of paragraphs is assigned to a vertical line in a set of vertical lines; and wherein said visually coded graphic includes a depiction of said graphical indicators on each vertical line corresponding to the presence of said search term in said paragraph.

10. A method to facilitate review of a set of document search results comprising:

a. receiving, as a computer machine input, a query request wherein said query request comprises two or more search terms;

b. accessing a corpora of electronically stored content either directly or indirectly on at least one computer readable storage medium;

c. searching said corpora for a set of relevant documents;

d. scoring a set of paragraphs, within said set of relevant documents, using an algorithm which calculates a measurement of term density versus term diversity for each of said set of paragraphs;

e. ranking said set of paragraphs based on said measurement; and f. generating for graphical display:

i. a legend correlating a visually coded graphical indicator with each search term;

ii. a list of a subset of said set of relevant documents;

iii. if a paragraph, associated with a document that was not included in said subset of relevant documents, receives a higher score, in said ranking step, than any paragraph in said subset of relevant documents, inserting said document in said subset of relevant documents; and iv. an icon, selected from the group consisting of a boxed abacus icon and a tile bar icon, for each document in said list of relevant documents, summarizing whether a search term is present in a preset number of paragraphs associated with said document.

11. A non-transitory computer readable medium comprising computer executable instructions for execution by a computer machine to facilitate review of a set of document search results that when executed:

a. receives a query request comprising two or more search terms;

b. accesses a corpora of electronically stored content either directly or indirectly;

c. searches a corpora for a set of candidate documents;

d. scores a set of paragraphs associated with said set of candidate documents using an algorithm which calculates a measurement of term density versus term diversity;

e. ranks said set of paragraphs based on said measurement;

f. generates for graphical display at least one boxed abacus icon for each of a subset of said set of candidate documents wherein a unique visually-coded graphical indicator is associated with each search term and displayed on a line associated with a given paragraph from a subset of said set of paragraphs to indicate if said search term is present in said given paragraph and, if a paragraph, associated with a document that was not included in said set of candidate documents, scores higher, than any paragraph in said set of candidate documents, inserting said document in said set of candidate documents.

12. A non-transitory computer readable medium, as claimed in claim 11, wherein said boxed abacus icon is linked to a set of underlying content associated with each paragraph depicted in said boxed abacus icon and wherein said boxed abacus icon may be clicked through to display said set of underlying content.

13. A non-transitory computer readable medium, as claimed in claim 12, wherein said search terms are highlighted in a display of said set of underlying content.

14. A non-transitory computer readable medium, as claimed in claim 11, wherein said subset of said candidate documents is chosen based on the documents containing the highest scoring paragraphs when said paragraphs are ranked.

15. A non-transitory computer readable medium, as claimed in claim 14, wherein each boxed abacus icon includes only one paragraph from each document in said subset.

* * * * *